US012126614B2

(12) United States Patent
Chitalia et al.

(10) Patent No.: US 12,126,614 B2
(45) Date of Patent: Oct. 22, 2024

(54) USE OF WEB AUTHENTICATION TO ENHANCE SECURITY OF SECURE REMOTE PLATFORM SYSTEMS

(71) Applicant: Visa International Service Association, San Francisco, CA (US)

(72) Inventors: Jalpesh Chitalia, Castro Valley, CA (US); Gavin Shenker, San Francisco, CA (US); Manoj Kannembath, San Ramon, CA (US); Amit Gupta, Dublin, CA (US)

(73) Assignee: Visa International Service Association, San Francisco, CA (US)

( * ) Notice: Subject to any disclaimer, the term of this patent is extended or adjusted under 35 U.S.C. 154(b) by 279 days.

(21) Appl. No.: 17/764,123

(22) PCT Filed: Nov. 12, 2020

(86) PCT No.: PCT/US2020/060287
§ 371 (c)(1),
(2) Date: Mar. 25, 2022

(87) PCT Pub. No.: WO2021/097130
PCT Pub. Date: May 20, 2021

(65) Prior Publication Data
US 2023/0022797 A1 Jan. 26, 2023

Related U.S. Application Data

(60) Provisional application No. 62/934,988, filed on Nov. 13, 2019.

(51) Int. Cl.
*H04L 9/40* (2022.01)
*H04L 9/08* (2006.01)
*H04L 9/32* (2006.01)

(52) U.S. Cl.
CPC ............ *H04L 63/083* (2013.01); *H04L 63/08* (2013.01); *H04L 63/0861* (2013.01); *H04L 9/08* (2013.01); *H04L 9/32* (2013.01); *H04L 9/40* (2022.05)

(58) Field of Classification Search
CPC . H04L 63/083; H04L 63/0861; H04L 9/3247; G06F 21/32; G06F 2221/2115; G06Q 20/40145
See application file for complete search history.

(56) References Cited

U.S. PATENT DOCUMENTS 9,785,940 B2    10/2017  Deoliveira et al.
11,321,707 B2 *  5/2022  Chitalia ........... G06Q 20/40145
(Continued)

FOREIGN PATENT DOCUMENTS

KR    20140046830 A    4/2014

OTHER PUBLICATIONS

"BioWallet: A Biometric Digital Wallet"—Benli et al, Faculty of Computer and Informatics, Istanbul Technical University, Apr. 2017 https://www.researchgate.net/publication/329373831_BioWallet_A_Biometric_Digital_Wallet (Year: 2017).*

(Continued)

*Primary Examiner* — Randy A Scott
(74) *Attorney, Agent, or Firm* — Kilpatrick Townsend & Stockton LLP

(57) ABSTRACT

A method includes receiving, by a universal authentication application from a resource provider computer, a user credential verification request message comprising a user identifier, server computer data, and interaction data for an interaction. The universal authentication application transmits the user credential verification request message to a browser that invokes the authenticator to verify biometric information of a user. The universal authentication application receives a user credential verification response message from the authenticator. The user credential verification response message includes signed interaction data. The universal authentication application sends the user credential verification response message to the resource provider (Continued)

computer. The resource provider computer provides at least the signed interaction data to a plurality of server computers to retrieve a plurality of portable device credentials respectively associated with the plurality of server computers.

19 Claims, 6 Drawing Sheets

(56) References Cited

U.S. PATENT DOCUMENTS

| | | | |
|---|---|---|---|
| 2013/0080333 A1* | 3/2013 | Kamotskyy | G06Q 20/3672 |
| | | | 705/41 |
| 2017/0278096 A1 | 9/2017 | Chitalia et al. | |
| 2019/0005487 A1* | 1/2019 | Maheshwari | G06Q 20/3223 |
| 2019/0114635 A1 | 4/2019 | Gurunathan | |

OTHER PUBLICATIONS

"How to Authenticate Digital Wallet Users with 3DS2"—G-Payments, Neurocom, Aug. 12, 2019 https://blog.gpayments.com/article/how-to-authenticate-digital-wallet-users-with-3ds2/ (Year: 2019).*
PCT/US2020/060287 , "International Search Report and Written Opinion", Mar. 5, 2021, 11 pages.
EP20888476.7, "Extended European Search Report", Nov. 9, 2022, 7 pages.

* cited by examiner

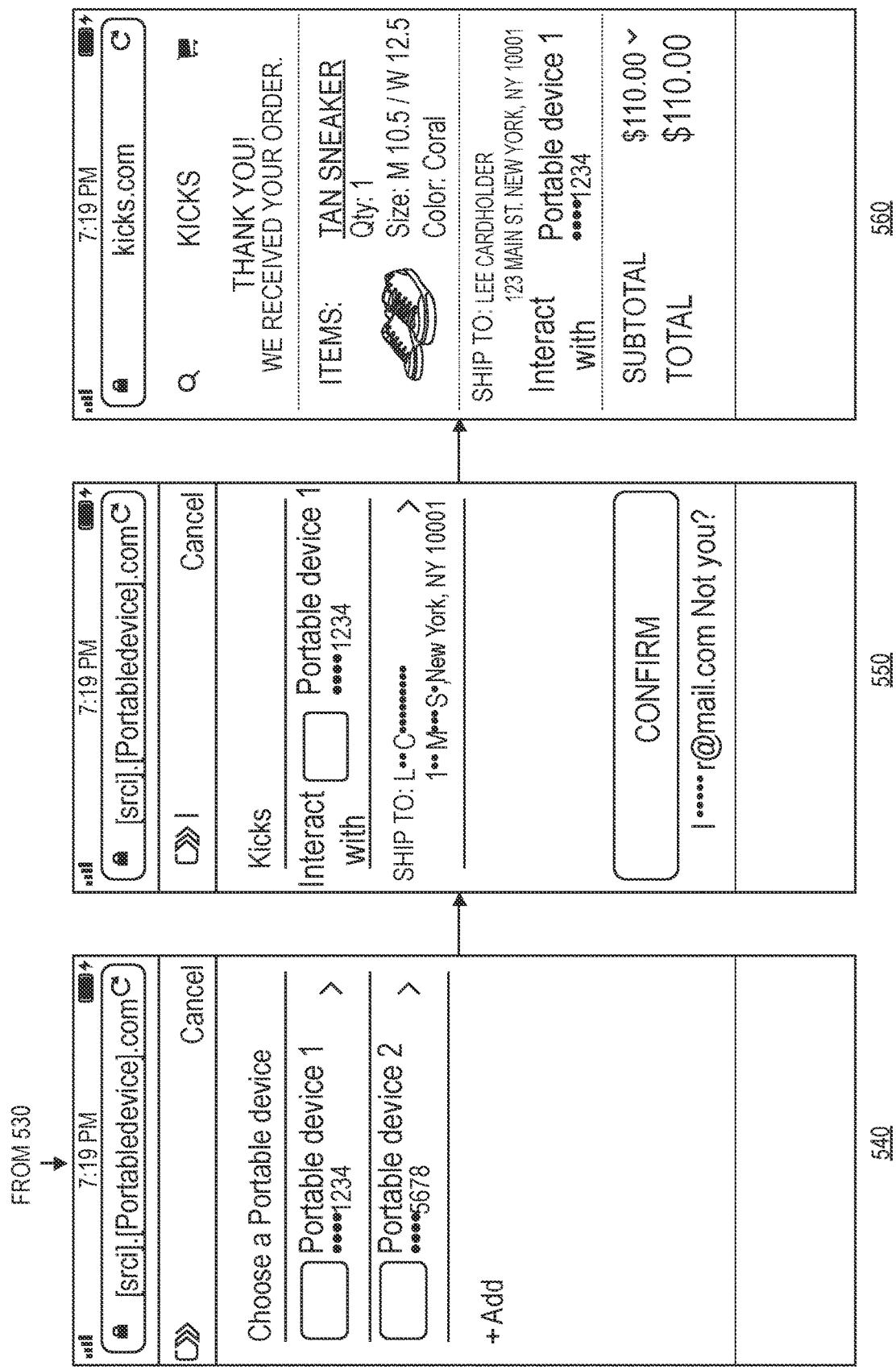

USE OF WEB AUTHENTICATION TO ENHANCE SECURITY OF SECURE REMOTE PLATFORM SYSTEMS

CROSS-REFERENCES TO RELATED APPLICATIONS

This application is a National Stage of International Application No. PCT/2020/060287, filed Nov. 12, 2020, which claims priority to U.S. Provisional Application 62/934,988, filed on Nov. 13, 2019, which is incorporated herein by reference for all purposes in its entirety.

BACKGROUND

Conventional secure remote platform systems such as secure remote transaction (SRT) systems use browser cookies to authenticate a user's device and retrieve registered account information of different cards. A problem with this is that browser cookies stored on the user's device can be stolen or can be inadvertently deleted. Other types of authentication also exist. For example, the web standard of Web Authentication (WebAuthn) provides a way to authenticate users for web applications using other types of information such as biometric authentication.

One drawback of utilizing WebAuthn with biometric authentication is that a separate biometric verification may be required for each account credential associated with a user. Thus, when retrieving account information with different SRT systems to display a card list for interaction selection during an interaction, a separate biometric reading may be requested for each SRT system. This is burdensome for both the user and the devices involved in the process. For example, the user needs to input their biometric information multiple different times in order to allow multiple SRT systems to provide account credentials to be displayed in the card list. This process is further burdensome for the devices because a large number of communications need to be made throughout the network depending on how many SRT systems are requesting biometric authentication of the user. Further, a bottleneck in processing capabilities occurs when the user device is only able to request a single biometric reading at a time. This lengthens the total time it takes to process the interaction.

Embodiments of the disclosure address this problem and other problems individually and collectively.

SUMMARY

Embodiments are related to methods and systems for secure authentication.

One embodiment is related to a method comprising: receiving, by a universal authentication application from a resource provider computer, a user credential verification request message comprising a user identifier, server computer data, and interaction data for an interaction between a resource provider of the resource provider computer and a user of a user device; transmitting, by the universal authentication application, the user credential verification request message to a web browser that invokes the authenticator to verify biometric information of the user; receiving, by the universal authentication application, a user credential verification response message from the authenticator, the user credential verification response message comprising signed interaction data; and sending, by the universal authentication application, the user credential verification response message to the resource provider computer, wherein the resource provider computer provides at least the signed interaction data to a plurality of server computers to retrieve a plurality of portable device credentials respectively associated with the plurality of server computers.

Another embodiment is related to a user device comprising: a processor; and a computer-readable medium coupled to the processor, the computer-readable medium comprising code executable by the processor for implementing a method comprising: receiving, by a universal authentication application of the user device from a resource provider computer, a user credential verification request message comprising a user identifier, server computer data, and interaction data for an interaction between a resource provider of the resource provider computer and a user of the user device; transmitting, by the universal authentication application, the user credential verification request message to a web browser that invokes the authenticator to verify biometric information of the user; receiving, by the universal authentication application, a user credential verification response message from the authenticator, the user credential verification response message comprising signed interaction data; and sending, by the universal authentication application, the user credential verification response message to the resource provider computer, wherein the resource provider computer provides at least the signed interaction data to a plurality of server computers to retrieve a plurality of portable device credentials respectively associated with the plurality of server computers.

One embodiment is related to a method comprising: receiving, by a resource provider computer, an interaction request message comprising a recognition identifier from a user device; providing, by the resource provider computer, a recognition request message comprising the recognition identifier to a plurality of server computers; respectively receiving, by the resource provider computer, two or more recognition response messages from two or more server computers of the plurality of server computers, each recognition response message comprising a user identifier and server computer data; selecting, by the resource provider computer, a selected recognition response message of the one or more recognition response messages; generating, by the resource provider computer, a user credential verification request message comprising the user identifier, the server computer data of the selected recognition response message, and interaction data; transmitting, by the resource provider computer, the user credential verification request message to an universal authentication application, wherein the universal authentication application provides the user credential verification request message to a web browser that invokes an authenticator to verify biometric information of a user of the user device; and receiving, by the resource provider computer, a user credential verification response message from the authenticator via the universal authentication application, the user credential verification response message comprising signed interaction data.

Further details regarding embodiments of the disclosure can be found in the Detailed Description and the Figures.

BRIEF DESCRIPTION OF THE DRAWINGS

FIGS. 5A and 5B show user interfaces illustrating a flow of an exemplary user experience using biometrics with WebAuthn according to various embodiments.

DETAILED DESCRIPTION

Figure 1:
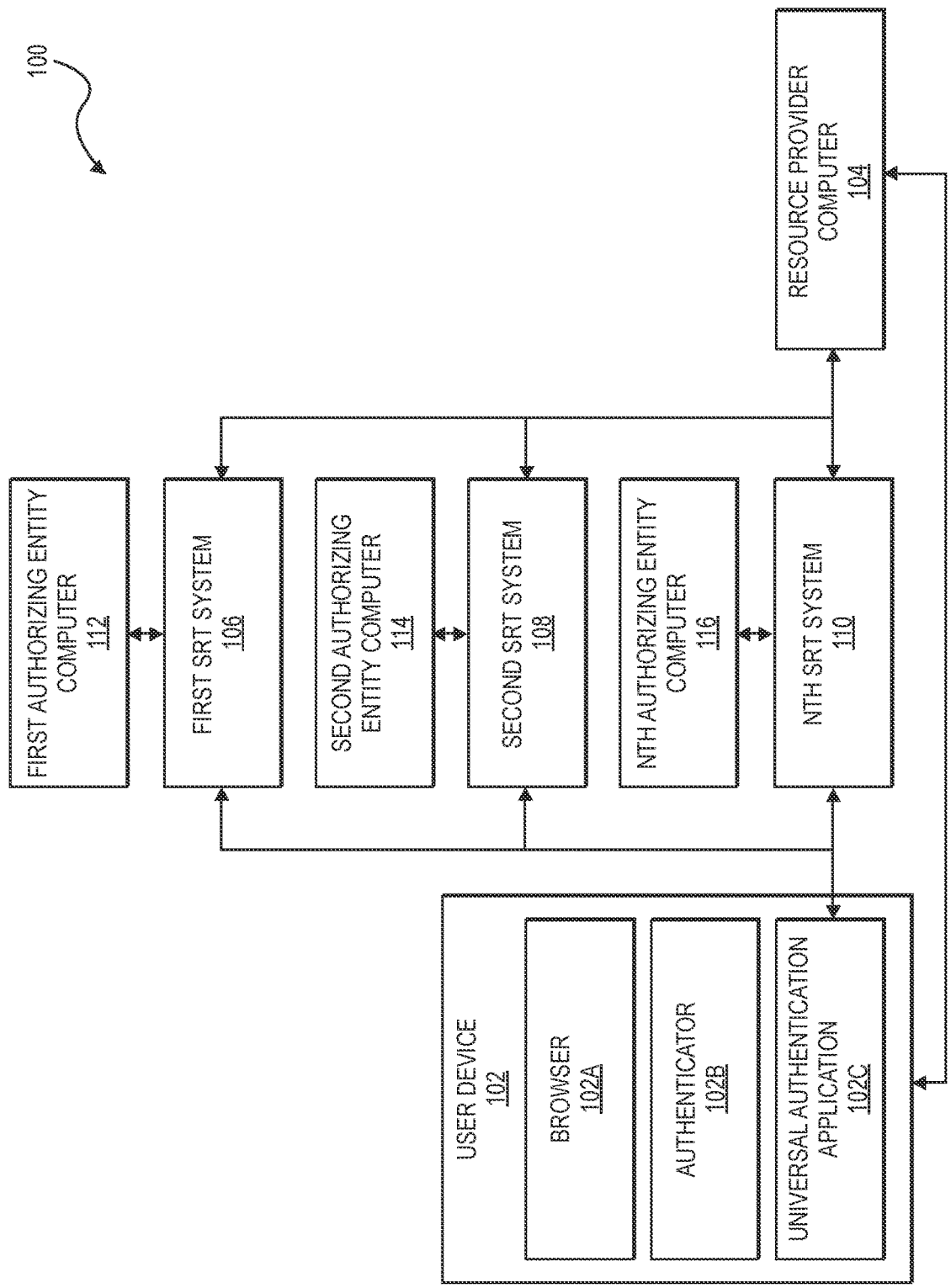
FIG. 1 shows a block diagram of a secure interaction system according to embodiments.

Prior to discussing embodiments of the disclosure, some terms can be described in further detail.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the user, or in some embodiments, a portable device.

A "checkout element" may be any mechanism for initiating a transaction. For example, a checkout element may comprise a button on a graphical user interface that, when selected, causes a transaction to be initiated.

A "cookie" (aka, a "web cookie," "Internet cookie," or "browser cookie") may be any suitable piece of data sent from a webserver and stored on a user's computer. A cookie may be placed on a user's computer by the computer's web browser while the user is browsing a website maintained by the webserver.

A "secure remote transaction (SRT) platform" may be any entity capable of facilitating a transaction in the manners described. A SRT platform may be capable of communicating with an initiator, a facilitator, and a transaction processing network. In some embodiments, a SRT platform may include a SRT server, a token provider, and a transaction processing network. An SRT platform may be configured to perform one or more processes that include: receive a request for a transaction from an initiator, identify an account associated with the transaction, determine an appropriate facilitator for the account, cause the determined facilitator to authenticate a user associated with the account, generate a token to be used in the transaction, and provide the token to the initiator to complete the transaction. In some implementations, a SRT platform may also be referred to as a secure remote commerce (SRT) platform.

The term "resource" generally refers to anything that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may be a good or service, a physical building, a computer account or file, or a payment account.

A "resource provider" may be an entity that can provide a resource such as goods, services, information, and/or access to such a resource. Examples of a resource provider include merchants, online or other electronic retailers, access devices, secure data access points, etc. A "merchant" may typically be an entity that engages in transactions and can sell goods or services, or provide access to goods or services. A "resource provider computer" may be any computing device operated by a resource provider.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data (e.g., a secure data interaction), a secure webpage (e.g., a secure webpage interaction), a secure location (e.g., a secure location interaction), and the like. In other embodiments, an interaction can include a payment transaction in which two devices can interact to facilitate a payment.

"Interaction data" may be data associated with an interaction. For example, an interaction may be a transfer of a digital asset from one party to another party. In some embodiments, an interaction can include a transaction between a user and a resource provider. Interaction data, for example, may include a transaction amount. In some embodiments, interaction data can indicate different entities that are party to an interaction as well as value or information being exchanged. Interaction data can include an interaction amount, information associated with a sender (e.g., a token or account information, an alias, a device identifier, a contact address, etc.), information associated with a receiver (e.g., a token or account information, an alias, a device identifier, a contact address, etc.), one-time values (e.g., a random value, a nonce, a timestamp, a counter, etc.), and/or any other suitable information. An example of interaction data can be transaction data.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "user identifier" can include any piece of data that can identify a user. A user identifier can comprise any suitable alphanumeric string of characters. In some embodiments, a user identifier may be derived from user identifying information. A user identifier can be a universally unique identifier (UUID). A UUID can be of any suitable format, for example, 32 hexadecimal digits, 16 alphanumeric digits, etc. An example user identifier can be "123e4567-e89b-12d3-a456-426614174000."

An "authenticator" can include hardware and/or software utilized for authentication. An authenticator can include a biometric reader configured to process biometric information. An authenticator can obtain and process biometric information to authenticate the individual (e.g., user) associated with the biometric information. An authenticator can include a biometric reader.

A "biometric" may be any human characteristic that is unique to an individual. For example, a biometric may be a person's fingerprint, voice sample, face, DNA, retina, etc.

"Biometric information" can include data relating to a biometric. Biometric information can include biometric samples and/or biometric templates.

A "biometric reader" may include a device for capturing data from an individual's biometric sample. Examples of biometric readers may include fingerprint readers, front-facing cameras, microphones, and iris scanners. In some embodiments, a user device may comprise a biometric reader (e.g., an authenticator).

A "biometric sample" may include data obtained by a biometric reader. The data may be either an analog or digital representation of the user's biometric, generated prior to determining distinct features needed for matching. For example, a biometric sample of a user's face may be image data. In another example, a biometric sample of a user's voice may be audio data.

A "biometric template" or "biometric sample template" may include a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual.

A "universal authentication application" can include a program or piece of software designed and written to verify the identity of something. A universal authentication application can act as a universal application by receiving user credential verification request messages including server computer data originating from a plurality of different server computers (e.g., SRT systems). A universal authentication application can be configured to receive user credential verification request messages from resource provider computers, and then provide the user credential verification request messages to browsers on user devices.

A "universal authentication application identifier" can include any piece of data that can identify a universal authentication application. A universal authentication application identifier can be a unique identifier. The universal authentication application identifier may identify a universal authentication application to browsers, for example.

A "portable device" can include device capable of being transported or conveyed easily by hand. A portable device may be a used to conduct an interaction. A portable device may include a storage technology (e.g., electronic memory, magnetic stripe, etc.) to store credentials or tokens associated with an account of a user. A portable transaction device can be in any of the forms described above with respect to the portable communication device, or in the form of a card (e.g., integrated chip card, magnetic stripe card) or a fob, etc. In some embodiments, the portable transaction device and the user device may be the same device, and need not be separate devices (e.g., the portable device credentials are securely stored on the user device, etc.). Examples of portable devices can include wearable devices, payment cards such as credit, debit, and prepaid cards, vehicles with remote communication capabilities, etc.

"Portable device credentials" can include any suitable information associated with a portable device. A portable device can be associated with an account. Portable device credentials may be directly related to the account or may be derived from information related to the account. Examples of account credentials may include a PAN (primary account number or "account number"), user name, expiration date, CVV (card verification value), dCVV (dynamic card verification value), CVV2 (card verification value 2), CVC3 card verification values, etc.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers. In some embodiments, a SRT system can be referred to as a server computer.

"Server computer data" can include a set of values of qualitative or quantitative variables stored by a server computer. In some embodiments, server computer data can include data related to the server computer. In some embodiments, server computer data can include data related to a user and/or a user device that is associated with the server computer via a portable device. Server computer data can include relying party data, where the relying party is the operator of the server computer (e.g., the SRT system). In some embodiments, server computer data can include user profile data. For example, when the server computer is an SRT system and the server computer data includes user profile data, the user profile data can include an identifier, or a reference for an identity of a portable device associated with the user, a user device identity, or a user identity as well as the profile of the user. In some embodiments, the server computer data can include a token number associated with the portable device, user device data, user data (e.g., address, phone number, etc.) as well as prior interaction history.

A "recognition identifier" can include a sequence of characters used for identification of a person or thing from previous encounters or knowledge. A recognition identifier can include an identifier that is associated with a user and/or a user device. A server computer can evaluate the recognition identifier to determine whether or not the user and/or the user device is recognized. A user and/or a user device may be recognized when a currently evaluated recognition identifier matches a previously evaluated, created, or stored recognition identifier. In some embodiments, a recognition identifier can be a unique identifier associated with a user device. For example, a recognition identifier can be a user device identifier (e.g., "123456ABCD," "XYZABC," "987654," etc.).

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Conventional platforms that employ secure remote transaction (SRT) use browser cookies to authenticate a user's device and retrieve registered account information of different cards (e.g., portable device credentials). However, browser cookies stored on a user device can be stolen or can be inadvertently deleted. Instead of using cookies, embodiments can integrate Web Authentication (WebAuthn) with the SRT platform to provide a more secured authentication mechanism using biometrics. One drawback of simply utilizing WebAuthn is that a separate biometric verification may be required for each portable device credential. Thus, when retrieving portable device credentials with different server computers (e.g., SRT systems) to display a portable device credential list to the user for selection during the interaction, a separate biometric reading may be requested for each server computer.

To eliminate the need to request separate biometrics for each relying party, embodiments can utilize an universal authentication application to provide a trusted attestation (e.g., a signed public key and/or signed interaction data) to a resource provider computer upon a single biometric verification. The resource provider computer can then use the trusted attestation to retrieve account information from each SRT system without requesting a separate biometric reading from the user for each SRT system.

Further problems that embodiments can solve relate to 1) user authentication and 2) user identification. For example, for 1) user authentication embodiments can solve problems related to current SRT experiences relying on email one time password (OTP) for user authentication and verification. Email OTP are susceptible to interception and phishing attacks. Further, for 2) user identification the following problems may be addressed by embodiments: currently SRT relies on web cookies for user identification, the use of cookies requires consent, often associated with marketing, and cookies get deleted fairly frequently.

To solve one or more of the above listed problems, or other problems, embodiments can utilize the following approaches: 1) most browsers support some version of WebAuthn APIs to provide strong authentication of a recognized user. For example, embodiments can utilize user device biometrics, which can meets strong user authentication requirements. 2) Embodiments can also provide a means to securely identify the user on a device utilizing, for example, WebAuthn. This can allow embodiments to provide an alternative to cookies and is persistent on a user device and works across browsers and applications.

FIG. 1 shows a system 100 according to various embodiments. The system 100 comprises a user device 102, a resource provider computer 104, a plurality of SRT systems including a first SRT system 106, a second SRT system 108, and an Nth SRT system, as well as a plurality of authorizing entity computers including a first authorizing entity computer 112, a second authoring entity computer 114, and an Nth authorizing entity computer 116. The user device 102 can include a browser 102A (e.g., a web browser), an authenticator 102B (e.g., a biometric scanner), and a universal authentication application 102C. In some embodiments, the plurality of SRT systems can be referred to as a plurality of server computers. As such, the first SRT system 106 can be a first server computer.

The user device 102 can be in operative communication with the plurality of SRT systems including the first SRT system 106, the second SRT system 108, and the Nth SRT system 110. The user device 102 can be in operative communication with the resource provider computer 104. The resource provider computer 104 can be in operative communication with the plurality of SRT systems including the first SRT system 106, the second SRT system 108, and the Nth SRT system 110. The plurality of SRT systems including the first SRT system 106, the second SRT system 108, and the Nth SRT system 110 can be, respectively, in operative communication with the plurality of authorizing entity computers including the first authorizing entity computer 112, the second authorizing entity computer 114, and the Nth authorizing entity computer 116.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between the devices of the system 100 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 102 can include a device operated by the user. The user device 102, for example, can include a smartphone. The user device 102 can be configured to initiate an interaction with the resource provider computer 104 to obtain a resource or access to a resource. The user device 102 can connect to a webpage hosted by or associated with the resource provider computer 104 using the browser 102A.

The browser 102A can include a computer program with a graphical user interface for displaying and navigating between web pages on the World Wide Web. When the user of the user device 102 requests a web page from a particular website (e.g., a resource provider web page), the browser 102A retrieves the necessary content from a web server and then displays the page on the user device 102.

In some embodiments, the browser 102A can be device software on the user device 102 that is an Internet-of-Things device (e.g., a smart car, a smart fridge, a television streaming device, etc.). In other embodiments, the browser 102A can be a marketplace website or application (e.g., a messaging application, an online marketplace, a social media website with a marketplace, etc.). In yet other embodiments, the browser 102A can be an operating system (OS) interface (e.g., windows applications, iOS, Android OS, etc. that provides an interface to the World Wide Web).

The user device 102 can be configured to send data to the resource provider computer 104 and receive data from the resource provider computer 104 regarding the interaction. For example, the user device 102 can provide an interaction request message comprising a recognition identifier and any interaction data associated with the interaction to the resource provider computer 104.

The resource provider computer 104 can be operated by a resource provider (e.g., a merchant, a payment service provider, a location access service, etc.). The resource provider computer 104 can receive the interaction request message, and then provide the recognition identifier to each SRT system of the plurality of SRT systems. Each SRT system (e.g., 106, 108, and 110) can determine whether or not the recognition identifier matches a previously evaluated, created, and/or stored recognition identifier (e.g., determine whether or not the user and/or the user device 102 is recognized). Each SRT system (e.g., 106, 108, and 110) can provide a recognition response message to the resource provider computer 104, which either indicates that the user and/or the user device 102 is recognized or indicates that the user and/or the user device 102 is not recognized.

In some embodiments, each recognition response message includes a user identifier and server computer data. The user identifier can identify the user of the user device 102. The server computer data can include relying party information. The server computer data can include an identity reference to a user profile (e.g., a digital reference to a profile associated with the user of the user device 102). The server computer data can also include any suitable data related to the user profile (e.g., a token number of a portable device issued to the user, user interaction history (e.g., interaction data related to previously performed interactions), data related to the user (e.g., phone number, mailing address, email address, birthdate, ZIP code, demographic information, etc.), and/or any other information that describes the user and/or the user device 102. In some embodiments, the server computer data can further comprise data relating to the server computer (e.g., SRT system) at which the server computer data is stored. For example, the server computer data can include a server computer IP address, a server computer identifier, a name of the server computer operator, a digital certificate issued to the server computer by a certificate authority, a server computer public key, and/or other data that identifies and/or provides for communication with the server computer.

The resource provider computer 104 can then select a recognition response message of the one or more recognition response messages received from the plurality of SRT systems. For example, the resource provider computer 104 can be configured to select the first received recognition response message that indicates that the user and/or the user device 102 is recognized.

The resource provider computer 104 can further be configured to generate and transmit a user credential verification request message based on the selected recognition response message to the universal authentication application 102C of the user device 102. The user credential verification request message can include the user identifier, the server computer data of the selected recognition response message, and interaction data.

The user device 102 can be configured to receive data from the resource provider computer 104 via the universal authentication application 102C. In some embodiments, the universal authentication application 102C can also receive a user credential verification request message regardless of the server computer data included therein. For example, the universal authentication application 102C is configured to receive user credential verification request messages comprising server computer data originating from the first SRT system 106, the second SRT system 108, or the Nth SRT system 110.

The universal authentication application 102C can provide the user credential verification request message to the browser 102A of the user device 102. The browser 102A can be configured to modify the user credential verification request message to include an origin (e.g., universal authentication application 102C, SRT system, etc.) of the user credential verification request message. The browser 102A then provides the user credential verification request message to the authenticator 102б.

The authenticator 102б can be configured to evaluate the origin of the user credential verification request message. For example, the authenticator 102б can determine whether or not the user credential verification request message originates from a trusted entity, computer, etc. The authenticator 102B can then obtain user biometric information to authenticate the user. For example, the authenticator 102B can include a biometric scanner, such as a fingerprint scanner. The user device 102 can prompt the user to scan their fingerprint on the fingerprint scanner. The authenticator 102B can obtain the biometric sample and generate a biometric template based on the biometric sample. The authenticator 102B can further compare the biometric template to a previously stored biometric template associated with the user of the user device 102. If the generated biometric template matches the previously stored biometric template, then the authenticator 102B determines that the user is authentic. If the generated biometric template does not match the previously stored biometric template, then the authenticator 102B determines that the user is not authentic (e.g., is the incorrect user).

In some embodiments, the authenticator 102B can sign (e.g., cryptographically sign) interaction data received in the user credential verification request message with any suitable private key.

After authenticating the user and signing the interaction data, the authenticator 102B can generate and send a user credential verification response message to the universal authentication application 308. The user credential verification response message can include at least the signed interaction data.

The resource provider computer 104 can be configured to communicate the signed interaction data with the plurality of SRT systems (e.g., the first SRT system 106, the second SRT system 108, and the Nth SRT system 110). Each SRT system can evaluate the signature of the signed interaction data using a previously stored public key corresponding to the private key utilized by the authenticator 102B. For example, the public key and the private key can be a user device public key and a user device private key, respectively. If an SRT system determines that the signature is valid, then the SRT system can provide a profile (e.g., a user profile comprising portable device credentials) to the resource provider computer 104.

The resource provider computer 104 can provide the received portable device credential(s) to the user device 102. The user device 102 can be configured to display the portable device credential(s) to the user. The user can select a selected portable device credential to utilize in the present interaction. The user device 102 can then communicate the selected portable device credential to the resource provider computer 104.

The resource provider computer 104 can be configured to communicate with the SRT system associated with the selected portable device credential to complete the interaction. For example, the resource provider computer 104 can generate authorization request messages, which can be provided to the relevant SRT system.

The SRT system can process the authorization request message to determine whether or not to authorize the interaction. In some embodiments, the SRT system can process the authorization request message in conjunction with an authorizing entity computer (e.g., the first authorizing entity computer 112, the second authorizing entity computer 114, and the Nth authorizing entity computer 116). For example, in some embodiments, the first authorizing entity computer 112 may be configured to authorize any suitable request, including access to data, access to a location, or approval for a payment. In some embodiments, the first authorizing entity computer 112 may be operated by an account issuer. Typically, the issuer is an entity (e.g., a bank) that issues and maintains an account of a user. The account may be a credit, debit, prepaid, or any other type of account.

Figure 2:
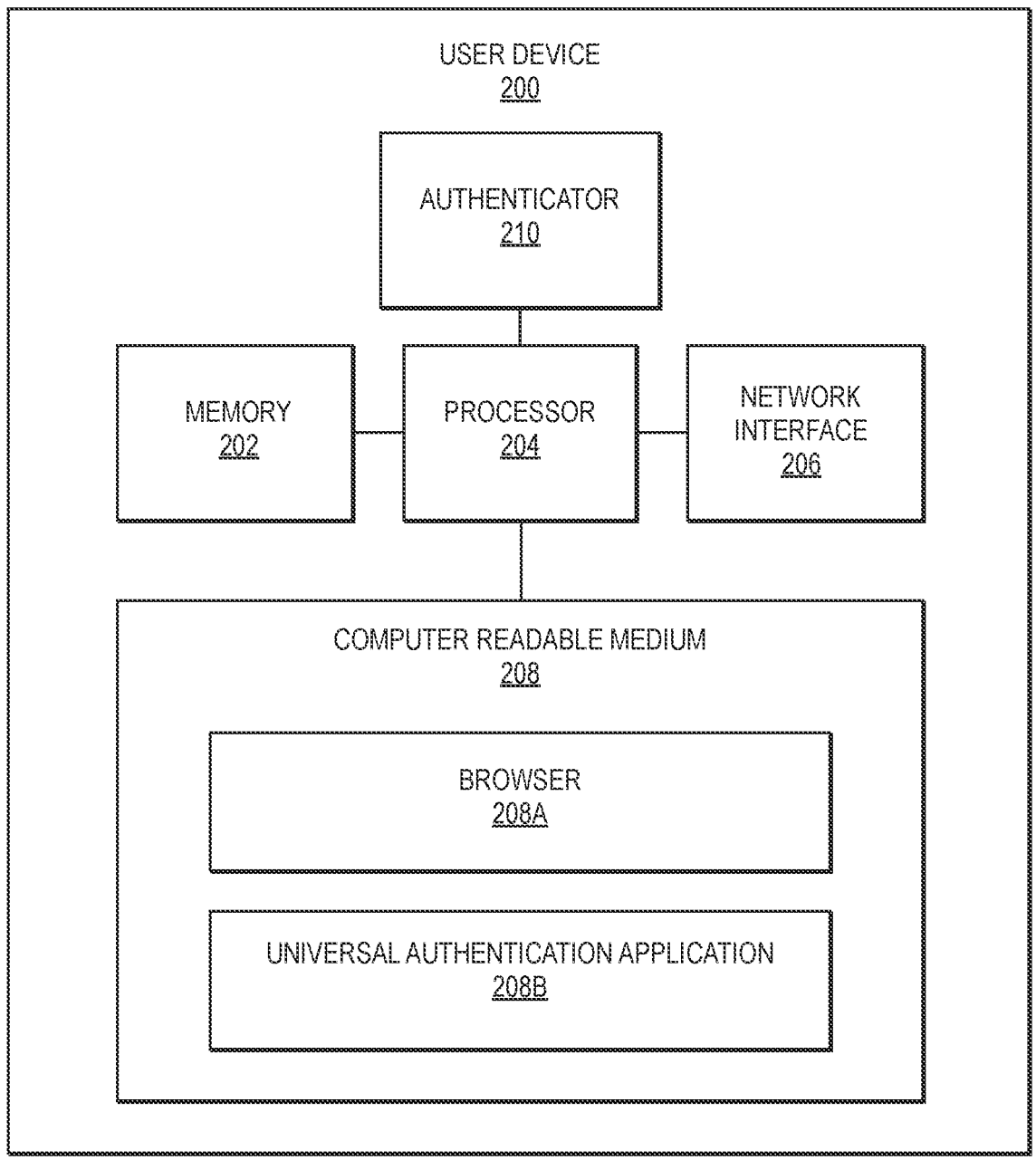
FIG. 2 shows a block diagram of components of a user device according to embodiments.

FIG. 2 shows a block diagram of a user device 200 according to embodiments. The exemplary user device 200 may comprise a processor 204. The processor 204 may be coupled to a memory 202, a network interface 206, a computer readable medium 208, and an authenticator 210. The computer readable medium 208 can comprise a browser 208A and a universal authentication application 208B.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store recognition identifiers, etc.

The computer readable medium 208 may comprise code, executable by the processor 204, for performing a method comprising: receiving, by a universal authentication application from a resource provider computer, a user credential verification request message comprising a user identifier, server computer data, and interaction data for an interaction between a resource provider of the resource provider computer and a user of a user device; transmitting, by the universal authentication application, the user credential verification request message to a web browser that invokes the authenticator to verify biometric information of the user; receiving, by the universal authentication application, a user credential verification response message from the authenticator, the user credential verification response message comprising signed interaction data; and sending, by the universal authentication application, the user credential verification response message to the resource provider computer, wherein the resource provider computer provides at least the signed interaction data to a plurality of server computers to retrieve a plurality of portable device credentials respectively associated with the plurality of server computers.

The browser 208A, also referred to as a web browser, is a software application for accessing information on the World Wide Web. The browser 208A, in conjunction with the processor 204, can access a web page from a particular website. The browser 208A, in conjunction with the processor 204, can retrieve content from a web server and then display the page on the user device 200. For example, once the web page has been retrieved, a rendering engine of the browser 208A, in conjunction with the processor 204, displays the web page on the display (e.g., screen) of the user device 200. In some embodiments, the browser 208A, in conjunction with the processor 204, can utilize an internal cache of web page resources to improve loading times for subsequent visits to the same page. The cache can store any suitable data such that the data may not need to be downloaded from the server again.

The universal authentication application 208B can include a program or piece of software designed and written to verify the identity of something. The universal authentication application 208B, in conjunction with the processor 204, can receive user credential verification request messages including server computer data originating from a plurality of different server computers (e.g., SRT systems). The universal authentication application 208B, in conjunction with the processor 204, can receive user credential verification request messages from resource provider computers, and then provide the user credential verification request messages to the browser 208A on the user device 200. In some embodiments, the universal authentication application 208B can be associated with a universal authentication application identifier. The universal authentication application identifier can identify the universal authentication application 208B to the browser 208A.

The network interface 206 may include an interface that can allow the user device 200 to communicate with external computers. The network interface 206 may enable the user device 200 to communicate data to and from another device (e.g., a resource provider computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
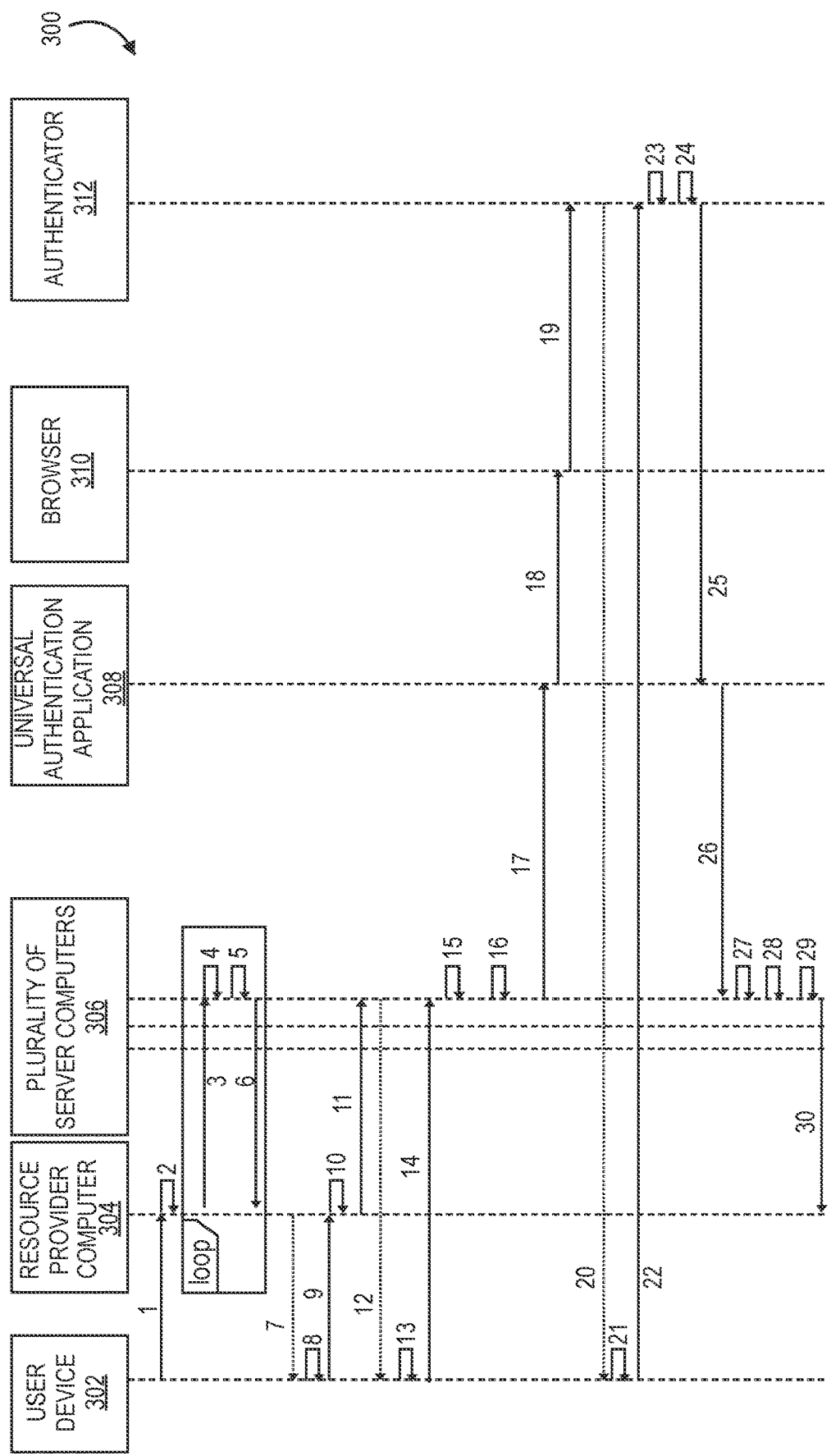
FIG. 3 shows a flow diagram illustrating a first time use of a user device with a resource provider computer according to embodiments.
Figure 4:
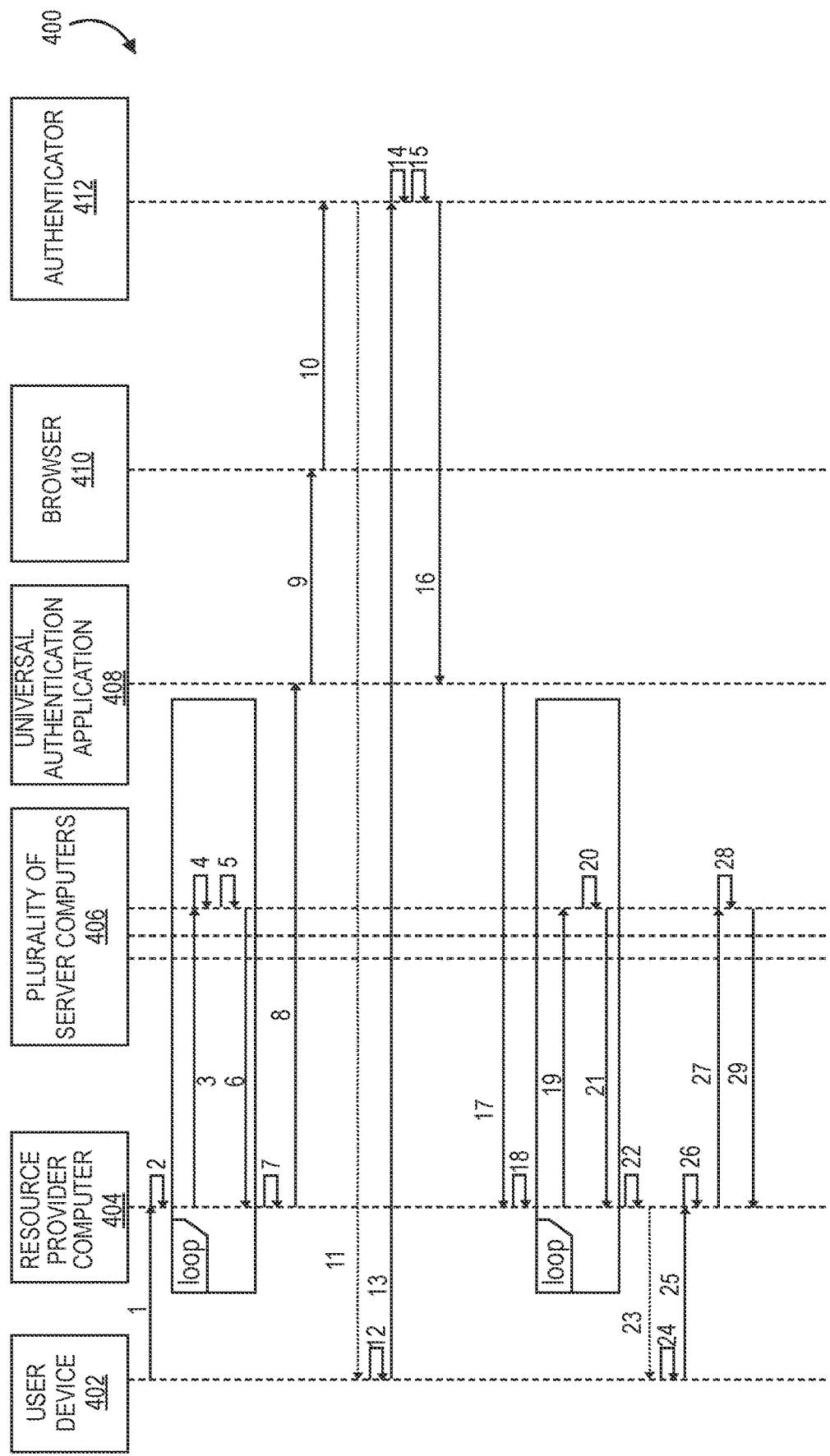
FIG. 4 shows a flow diagram illustrating a subsequent use of a user device with a resource provider computer according to embodiments.

Embodiments can use the systems and apparatuses described herein to at least perform secure authentication of a user. FIGS. 3-5 describe some examples of such methods.

FIG. 3 shows a flow diagram illustrating a first time use of a user device with a resource provider computer according to embodiments. The method 300 illustrated in FIG. 3 will be described in the context of a user (e.g., a consumer) initiating an interaction (e.g., a transaction) with a resource provider (e.g., a merchant/payment service provider) for the first time, during which, the user may be registered. It is understood, however, that the invention can be applied to other circumstances (e.g., a user requesting access to a secure webpage for the first time, etc.).

At step 1, the user can select to interact in a particular manner with the resource provider computer 304. For example, the user can select, on the user device 302, an interaction with SRT option. The interaction with SRT option may be a button provided to the user on the browser 310 that displays a webpage of the resource provider. For example, when visiting a resource provider computer's webpage via the browser 310 on the user device 302, the user can select to interact with the resource provider computer 304 using SRT. The user device 302 can send a message indicating the selection of the user to the resource provider computer 304. For example, the user device 302 can send an interaction request message to the resource provider computer 304. The interaction request message can include an indication to utilize SRT during the interaction. The interaction request message can also include a recognition identifier, a selection of items (e.g., products, data, etc.), a date, a time, and/or any other information related to the user requesting to perform an interaction with the resource provider computer 304.

The interaction request message includes interaction data. The interaction data can include data associated with the interaction between the user of the user device 302 and the resource provider of the resource provider computer 304. For example, the interaction can include a transaction between the user and the resource provider. The interaction data can include a transaction amount, a resource provider identifier, and a user device identifier. In some embodiments, the interaction data can indicate different entities that are party to an interaction as well as value or information being exchanged. In other embodiments, the interaction data can further include information associated with a sender (e.g., a token or account information, an alias, a device identifier, a contact address, etc.), information associated with a receiver (e.g., a token or account information, an alias, a device identifier, a contact address, etc.), one-time values (e.g., a random value, a nonce, a timestamp, a counter, etc.), and/or any other suitable information.

The recognition identifier can include an identifier that is associated with the user and/or the user device 302. The recognition identifier can be uniquely assigned to the user and/or the user device 302. When another device (e.g., the resource provider computer 304, a server computer, etc.) is communicating with the user device 302, the other device can evaluate the recognition identifier to determine whether or not the user device 302 is recognized. The user device 302 may be recognized if the other device has previously encountered the recognition identifier. For example, the other device (e.g., a server computer, etc.) can store a recognition identifier of a user device 302 after enrolling the user device 302 (e.g., as performed at step 15). For example, in some embodiments, a recognition identifier can be a user device identifier (e.g., "123456ABCD," "XYZABC," "987654," etc.).

At step 2, after receiving the interaction request message the resource provider computer 304 can generate a request to a plurality of server computers 306 (e.g., one or more SRT systems) to determine if the user of the user device 302 and/or, in some embodiments, the user device 302, is recognized by the one or more server computers. For example, the resource provider computer 304 can determine that the interaction request message includes an indication that the interaction is to be processed using SRT. The resource provider computer 304 can then generate a recognition request message comprising the recognition identifier.

At step 3, after generating the recognition request message, the resource provider computer 304 can transmit the recognition request message to the plurality of server computers 306.

At step 4, after receiving the recognition request message, each server computer of the plurality of server computers 306 can determine whether or not the user and/or the user device 302 is recognized based on the recognition identifier. For example, the server computer can determine whether or not the received recognition identifier matches a previously stored recognition identifier. For the example in FIG. 3, each server computer of the plurality of server computers 306 can determine that the recognition identifier is not recognized (e.g., matches a previously stored identifier).

At step 5, each server computer of the plurality of server computers 306 can generate a recognition response message indicating whether or not the recognition identifier is recognized. In some embodiments, the recognition response message, generated at each server computer separately, can include the recognition identifier.

At step 6, each server computer of the plurality of server computers 306 can transmit the recognition response message to the resource provider computer 304. For example, each server computer can respond to the resource provider computer 304 with an indication of whether or not the user and/or user device 302 is recognized. For example, during a first time use, the user may not be recognized. In such a case, a server computer can respond with "no," for example.

At step 7, after receiving the indication that the user is not recognized, the resource provider computer 304 can request portable device credential entry from the user. In some embodiments, the resource provider computer 304 can request entry of the portable device credentials via the browser 310. In some embodiments, the resource provider computer 304 can transmit a portable device credential request message to the user device 302.

At step 8, the user can enter the portable device credential(s). The portable device credential(s) can include any suitable information associated with a portable device that is associated with an account of the user. For example, the portable device credentials may be directly related to the account or may be derived from information related to the account. The portable device credentials can include any combination of PAN (primary account number or "account number"), user name, expiration date, CVV (card verification value), dCVV (dynamic card verification value), CVV2 (card verification value 2), CVC3 card verification values, etc., which may be concatenated together in any manner. The user device 302 can receive the portable device credentials via an input device (e.g., a touch screen, a keyboard, etc.).

At step 9, after receiving the portable device credentials, the user device 302 can provide the portable device credentials to the resource provider computer 304. The portable device credentials can be transmitted from the user device 302 to the resource provider computer 304 in any suitable secure manner. For example, the portable device credentials or the message comprising the portable device credentials can be encrypted in a manner such that the resource provider computer 304 is configured to decrypt the portable device credentials or the message comprising the portable device credentials.

At step 10, after receiving the portable device credentials, the resource provider computer 304 can generate an authorization request message. The authorization request message can include at least the interaction data and the portable device credentials. In some embodiments, the authorization request message can further comprise the recognition identifier, so that a selected server computer can store the recognition identifier when enrolling the user at step 15.

At step 11, the resource provider computer 304 can transmit the authorization request message to a selected server computer. The selected server computer can be the server computer that is associated with the portable device credentials. For example, the first digit, the last digit, the first four digits, the middle two digits, etc. of the portable device credentials can indicate with which server computer the portable device credentials are associated. For example, the portable device credentials can include the following as the first 16 digits: "1234567890123456." The resource provider computer 304 can determine that the selected server computer is the first server computer of the plurality of server computers 306 since the portable device credentials begins with the digit "1."

At step 12, upon receiving the authorization request message from the resource provider computer 304, the selected server computer can transmit a request for profile data to the user device 302 for enrollment of the user. The request for profile data can include a request for an email address, a phone number, a mailing address, a birthdate, and/or any other data related to the user.

At step 13, after receiving the request for profile data from the selected server computer of the plurality of server computers 306, the user device 302 can prompt the user to input profile data. The user can provide the profile data (e.g., email address, phone number, and/or any other suitable user data which may be used to identify the user) to the user device 302. In other embodiments, the profile data may already be stored in the user device 302. In which case, the user device 302 can retrieve the profile data from memory at step 13.

At step 14, after obtaining the profile data, the user device 302 can provide the profile data to the selected server computer.

At step 15, after receiving the profile data from the user device 302, the selected server computer can enroll the user. For example, the selected server computer of the plurality of server computers 306 can store the profile data and the recognition identifier in a database (e.g., a profile database). The selected server computer can further associate the portable device credentials with the profile data and/or the recognition identifier.

At step 16, the selected server computer can generate a user identifier for the user. The user identifier can be a universally unique identifier (UUID). In some embodiments, for example, the UUID may include a 128-bit number. The selected server computer can store the user identifier along with the profile data in the database.

Furthermore, the selected server computer can also generate, or retrieve from memory, server computer data. The server computer data can include any suitable data related to the user profile, user interaction history, and/or data related to the user. For example, the user profile can include a token number of a portable device issued to the user. The user interaction history can include interaction data related to previously performed interactions. The data related to the user can include a phone number, a mailing address, an email address, a birthdate, a ZIP code, demographic information, and/or any other information that describes the user. The server computer data can further comprise data relating to the server computer at which the server computer data is stored. For example, the server computer data can include a server computer IP address, a server computer identifier, a name of the server computer operator, a digital certificate issued to the server computer by a certificate authority, a server computer public key, and/or other data that identifies and/or provides for communication with the server computer. The selected server computer can retrieve the server computer data from a server computer data database maintained by the selected server computer.

At step 17, the selected server computer can transmit a credential creation request to the universal authentication application 308 (which may be part of an authentication abstraction layer). The credential creation request can be a request for an authenticator 312 on the user device 302 to set up user biometric information for authentication. The credential creation request includes the user identifier as well as the server computer data.

In some embodiments, the credential creation request can also include a universal authentication application identifier that identifies the universal authentication application. For example, the universal authentication application identifier can be an alphanumeric value that uniquely identifies the universal authentication application to the browser 310 and/or the authenticator 312. In some embodiments, the universal authentication application identifier can include a digital signature, a hash, or other cryptographically secure identifier. By using the universal authentication application identifier, the browser 310 and/or the authenticator 312 knows that the request is coming from a trusted source. Note also that the universal authentication application identifier may also be in a corresponding process step in FIG. 4.

At step 18, after receiving the credential creation request from the selected server computer, the universal authentication application 308 can forward the credential creation request to the browser 310 of the user device 302. The universal authentication application 308 can be a program installed on the user device 302 and can route the credential creation request to the browser 310 internally to the user device 302. In some embodiments, the universal authentication application 308 may verify the validity of the credential creation request (e.g., that the request includes a proper digital signature from a trusted party, that the request includes the user identifier and the server computer data, etc.).

At step 19, the browser 310 can forward the credential creation request to the authenticator 312 of the user device 302. In some embodiments, the browser 310 may modify the credential creation request to form an authenticator make credential request which may comprise an origin (e.g., an origin of the request), the user identifier, and the server computer data.

In some embodiments, if the credential creation request message includes the universal authentication application identifier, the browser 310 can validate the universal authentication application identifier. For example, the browser 310 can determine if the universal authentication application identifier is the same as an identifier stored in a list of acceptable identifiers (e.g., a whitelist). As another example, if the universal authentication application identifier is a signature formed from a private key of the universal authentication application 308 (or other suitable cryptographic key), then the browser 310 can cryptographically verify the signature using a public key of the universal authentication application 308.

In other embodiments, the browser 310 can provide the universal authentication application identifier to the authenticator 312 and invoke the authenticator 312 to validate the universal authentication application identifier. After receiving the credential creation request message comprising the universal authentication application identifier, the authenticator 312 can validate the universal authentication application identifier in any suitable manner described herein. In some embodiments, both the browser 310 and the authenticator 312 can validate the universal authentication application identifier.

The authenticator 312 may be a component installed on the user device 302 which can receive and/or capture biometric samples, convert the biometric samples into biometric templates, perform any suitable validating cryptographic process (e.g., signing a public key with a private key), and/or relaying data to other components of the user device 302.

At step 20, the authenticator 312 can prompt the user to set up credentials (e.g., biometric information). At step 21, the user device 302 can display the prompt from the authenticator 312 to the user. The user device 302 can then receive an input biometric from the user. At step 22, the user device 302 can provide the input biometric information to the authenticator 312 in any suitable manner which may depend upon the type of authenticator of the user device 302. For example, the user may place their finger on a fingerprint scanner.

At step 23, after receiving the biometric information from the user, the authenticator 312 can store the biometric information (e.g., as a biometric template) in a secure memory. The authenticator 312 can store the biometric information of the user in association with, for example, the user identifier.

At step 24, after storing the biometric information, the authenticator 312 can sign a public key with a private key. In some embodiments, the public key and the private key can be an authenticator public key and an authenticator private key. In other embodiments, the public key and the private key can be a user device public key and a user device private key. The private key can be stored in a secure memory or in software (e.g., host card emulator (HCE)) on the user device 302. The private key may be associated with a digital certificate issued by a certificate authority. As such, the selected server computer can validate a certificate chain for the private key back to the certificate authority. The authenticator 312 can sign the public key with the private key to form a digital signature on the signed public key.

At step 25, after authenticating the user and signing the public key, the authenticator 312 can transmit the signed public key to the universal authentication application 308. In some embodiments, the authenticator 312 can transmit the signed public key to the browser 310, which may then relay the signed public key to the universal authentication application 308.

At step 26, after receiving the signed public key, the universal authentication application 308 can transmit the signed public key (as well as the public key if the server computer does not already have it) to the selected server computer of the plurality of server computers 306.

At step 27, the selected server computer can validate the signed public key. If the selected server computer determines that the signed public key is valid, then the selected server computer can associate the signed public key, the authenticator 312, the user, and/or the received data related to the user to one another. The selected server computer can store the signed public key along with the profile data in the database. The signed public key can be utilized in subsequent interactions to verify signed interaction data, as in step 20 of FIG. 4, described in further detail below.

At step 28, the selected server computer can determine whether or not to authorize the interaction or process the transaction to obtain authorization (e.g., by transmitting an authorization request message to an authorizing entity computer). The selected server computer can determine whether or not to authorize the interaction based on the interaction data, the user device 302, the resource provider computer 304, the portable device credentials, determine fraud rates or rules, and/or any other suitable information that may influence whether or not the interaction is to be authorized. If the selected server computer determines to authorize the interaction between the user and the resource provider, then the selected server computer can generate an indication that the interaction is authorized. If the selected server computer determines not to authorize the interaction, then the selected server computer can generate an indication that the interaction is not authorized.

At step 29, the selected server computer of the plurality of server computers 306 can generate an authorization response message or forward an authorization response message that it received from an authorizing entity computer. The authorization response message can include the indication of whether or not the interaction is authorized. In some embodiments, the authorization response message can further comprise the user identifier and/or any other device identifying information.

At step 30, the selected server computer can then transmit the authorization response message to the resource provider computer 304. Once the resource provider computer 304 receives the authorization response message (not shown), the resource provider computer 304 can evaluate the authorization response message. The resource provider computer 304 can determine if the authorization response message indicates that the interaction is authorized. If the interaction is authorized, the resource provider computer 304 can provide an interaction response message to the user device 302 indicating that the interaction is authorized.

The resource provider computer 304 can further provide the requested resource to the user of the user device 302. For example, the resource provider computer 304, or a computer prompted by the resource provider computer 304, can release a physical product to the user, provide a digital file the user device 302, allow the user device 302 to access a secure webpage, allow the user to enter a secure location, place an order for delivery to the user's location, and/or any other suitable action that completes the interaction.

FIG. 4 shows a flow diagram illustrating a subsequent use of a user device with a resource provider computer according to embodiments. The method 400 of FIG. 4 will be described in the context of a user (e.g., a consumer) initiating an interaction (e.g., a transaction) with a resource provider (e.g., a merchant/payment service provider) after the user has previously been enrolled with one or more server computers (e.g., SRT systems). It is understood, however, that the invention can be applied to other circumstances (e.g., a user requesting access to a secure webpage, the user requesting a data transfer, the user requesting access to a secure location, etc.).

At step 1, the user can initiate an interaction, such as a transaction, a secure location access request, a secure webpage access request, etc., with the resource provider computer 404 using the user device 402. For example, the user can select to interact using SRT, for example, when visiting a resource provider computer's webpage via a browser 410 of the user device 402. The user device 402 can transmit an interaction request message comprising a recognition identifier to the resource provider computer 404. The recognition identifier can be a unique identifier associated with the user device 402. For example, the recognition identifier can be a user device identifier (e.g., "123456ABCD," "XYZABC," "987654," etc.).

The interaction request message can further comprise interaction data for the interaction between the user of the user device 402 and the resource provider of the resource provider computer 404. The interaction data can be secure location access request data, for example, for the user attempting to access a secure location (e.g., a locked building, an employee only location, a governmental building, etc.). The interaction data can include a door number, a location address, and/or other location identifying information. The user can have multiple portable devices that allow access to different locations. For example, the user can have a first portable device that allows access to their employer's building and a second portable device that allows access to their house. The first portable device can be associated with a first server computer. The second portable device can be associated with a second portable device. In other embodiments, the interaction data can be data associated with a purchase transaction.

At step 2, after receiving the interaction request message from the user device 402, the resource provider computer 404 generates a recognition request message. The recognition request message can comprise the recognition identifier.

The recognition request message can be a message which queries a server computer on whether or not the user device 402 is recognized.

At step 3, the resource provider computer 404 can provide the recognition request message to the plurality of server computers 406. For example, the resource provider computer 404 can send the same recognition request message to each server computer (e.g., SRT system).

At step 4, after receiving the recognition request message, each server computer of the plurality of server computers 406 can determine whether or not the user device 402 is recognized. For example, a server computer can compare the received recognition identifier to a plurality of stored identifiers in an identifier database. The plurality of stored identifiers can be stored in the identifier database during an enrollment step (e.g., at step 15 of FIG. 3). The server computer can determine whether or not the recognition identifier matches a stored identifier.

At step 5, each server computer of the plurality of server computers 406 can generate a recognition response message. For example, if the server computer determines that the user device 402 is not recognized (e.g., the recognition identifier does not match a stored identifier), then the server computer can generate the recognition response message comprising an indication that the user is not recognized.

If the server computer determines that the user device 402 is recognized (e.g., the recognition identifier matches a stored identifier), then the server computer can generate the recognition response message comprising an indication that the user is recognized, a user identifier, and server computer data. The user identifier can be an identifier that identifies the user and may comprise any suitable alphanumeric string of characters. In some embodiments, the user identifier is a universally unique identifier (UUID) (e.g., "123e4567-e89b-12d3-a456-426614174000."). The server computer data can be relying party information, where the server computer is the relying party. The server computer data can be an identity reference to a user profile (e.g., a digital reference to a profile associated with the user of the user device 402). The server computer data can include a token number of a portable device issued to the user, user interaction history, data related to the user (e.g., phone number, mailing address, email address, birthdate, ZIP code, demographic information, etc.), and/or any other information that describes the user and/or the user device 402. The server computer data can also include a server computer identifier.

In some embodiments, the recognition response message, which indicates that the user device 402 is recognized, can further comprise a token that indicates a type of interaction to perform. For example, the token can have a type equal to "SRT-webAuthN," "universal_auth," or other suitable type, that indicates the resource provider computer 404 to process the interaction with the universal authentication application 408.

At step 6, after generating the recognition response message, each server computer of the plurality of server computers 406 transmits the recognition response message to the resource provider computer 404. For example, the plurality of server computers 406 can comprise three different server computers. A first server computer can determine that the user device 402 is recognized, a second server computer can determine that the user device 402 is recognized, and a third server computer can determine that the user device 402 is not recognized. Each server computer transmits the respectively generated recognition response message to the resource provider computer 404. For example, the first server computer can transmit a first recognition response message comprising the indication that the user is recognized, the user identifier, and first server computer data. The second server computer can transmit a second recognition response message comprising the indication that the user is recognized, the user identifier, and second server computer data. The third server computer can transmit a third recognition response message comprising the indication that the user is not recognized. In some embodiments, the user identifier provided by different server computers can be the same user identifier. In other embodiments, the user identifier provided by different server computers may be different.

At step 7, after receiving a plurality of recognition response messages from the plurality of server computers 406, the resource provider computer 404 can select a recognition response message (e.g., a selected recognition response message) of the plurality of recognition response messages. For example, the resource provider computer 404 can receive three recognition response messages from three different server computers. In some embodiments, the resource provider computer 404 can select the first received recognition response message. In other embodiments, the resource provider computer 404 can select the first received recognition response message that comprises an indication that the user device 402 is recognized. In yet other embodiments, the resource provider computer 404 can randomly select one of the recognition response messages that comprises an indication that the user device 402 is recognized. The data included in the selected recognition response message can be utilized during steps 8-18, for example.

In some embodiments, the resource provider computer 404 can generate a list (or other data structure) comprising the server computers of the plurality of server computers 406 that provided a recognition response message comprising an indication that the user device 402 is recognized. For example, the resource provider computer 404 can create a list of participating server computers.

After selecting the selected recognition response message, the resource provider computer 404 can generate a user credential verification request message (e.g., a "credentials.get" command). The user credential verification request message comprises the user identifier, the server computer data of the selected recognition response message, and the interaction data.

At step 8, after selecting the selected recognition response message, the resource provider computer 404 can transmit the user credential verification request message to the universal authentication application 408.

In some embodiments, the user credential verification request message can also include a universal authentication application identifier that identifies the universal authentication application 408. For example, the universal authentication application identifier can include a digital signature or a hash value. In some embodiments, the resource provider computer 404 may store the universal authentication application identifier and may retrieve the universal authentication application identifier from memory to include in the user credential verification request message. In other embodiments, the resource provider computer 404 can receive the universal authentication application identifier from one or more server computers of the plurality of server computers 406.

At step 9, after receiving the user credential verification request message, the universal authentication application 408 can transmit the user credential verification request message to the browser 410 of the user device 402. In some embodiments, the universal authentication application 408 may be installed on the user device 402. For example, the universal authentication application 408 can forward the user credential verification request message to the browser 410 that invokes an authenticator 412 to verify biometric information of the user.

At step 10, after receiving the user credential verification request message, the browser 410 can provide the user credential verification request message to the authenticator 412.

In some embodiments, the browser 410 can modify the user credential verification request message to form a modified user credential verification request message (e.g., authenticatorGetCredential( )). The modified user credential verification request message can comprise the user identifier, the server computer data, and an origin. The origin can indicate where the message originated (e.g., the server computer via the universal authentication application 408, the server computer, the universal authentication application 408, etc.). The browser 410 can then provide the modified user credential verification request message to the authenticator 412 at step 10.

In some embodiments, if the user credential verification request message includes the universal authentication application identifier, the browser 410 can validate the universal authentication application identifier. For example, the browser 410 can determine if the universal authentication application identifier is the same as an identifier stored in a list of acceptable identifiers. As another example, if the universal authentication application identifier is a signature formed from a private key of the universal authentication application 408 (or other suitable cryptographic key), then the browser 410 can cryptographically verify the signature using a public key of the universal authentication application 408.

In other embodiments, the browser 410 can provide the universal authentication application identifier to the authenticator 412 and invoke the authenticator 412 to validate the universal authentication application identifier. After receiving the credential creation request message comprising the universal authentication application identifier, the authenticator 412 can validate the universal authentication application identifier in any suitable manner described herein. In some embodiments, both the browser 410 and the authenticator 412 can validate the universal authentication application identifier.

Steps 11-13 of FIG. 4 are similar to steps 20-22 of FIG. 3 and will not be repeated in detail here. At step 11, after receiving the user credential verification request message, the authenticator 412 can request the user to verify user credentials (e.g., biometric information of the user) based on the received request. For example, the authenticator 412 can prompt the user to scan a fingerprint, or otherwise capture a suitable biometric sample as a biometric template. As an illustrative example, the authenticator 412 can prompt the user device 402 to display a biometric information capture message to the user (e.g., on a screen of the user device 402). At step 12, the user device 402 can receive biometric information input by the user. The biometric information can be provided to the authenticator 412 at step 13.

At step 14, after receiving the biometric information, the authenticator 412 can verify that the biometric information matches previously stored biometric information associated with the user. The previously stored biometric information can be previously stored at step 23 of FIG. 3, for example. If the authenticator 412 determines that the received biometric information matches the previously stored biometric information, then the authenticator 412 can proceed to step 15. If the authenticator 412 determines that the received biometric information does not match the previously stored biometric information, then the authenticator 412 can repeat step 11 and may again prompt the user to input biometric information via the user device 402. In some embodiments, the authenticator 412 may prompt the user to input biometric information any predetermined number of times until the input biometric information matches the stored biometric information. After the predetermined number of times, the authenticator 412 can stop requesting biometric information from the user due to too many failed attempts. The authenticator 412 can provide an authentication failed message (not shown) to the resource provider computer 404 via the universal authentication application 408.

At step 15, after authenticating the user, the authenticator 412 can sign the interaction data with a private key. The private key can be an authenticator private key or a user device private key. In some embodiments, the private key can be stored in a secure hardware element or in software.

At step 16, the authenticator 412 can provide the signed interaction data to the universal authentication application 408. In some embodiments, the authenticator 412 can provide the signed interaction data to the browser 410, which then routes the signed interaction data to the universal authentication application 408. In other embodiments, the authenticator 412 can provide the signed interaction data in conjunction with the user identifier or other suitable data.

At step 17, after receiving the signed interaction data, the universal authentication application 408 can transmit the signed interaction data to the resource provider computer 404.

At step 18, after receiving the signed interaction data, the resource provider computer 404 can determine to which server computer(s) of the plurality of server computers 406 the resource provider computer 404 should provide the signed interaction data. For example, the resource provider computer 404 can utilize the list of participating server computers, by sending the signed interaction data to each server computer in the list of participating server computers.

At step 19, the resource provider computer 404 can provide the signed interaction data to the plurality of server computers 406. In some embodiments, the signed interaction data can be provided in a profile request message (e.g., getSRTProfile(signed interaction data)) to two or more server computers. In some embodiments, the resource provider computer 404 can transmit the signed interaction data to each server computer that provided the recognition response message comprising an indication that the user device 402 is recognized at step 7.

At step 20, after receiving the signed interaction data, each server computer (e.g., participating server computer) of the plurality of server computers 406 can validate the signed interaction data. For example, each participating server computer can validate a signature of the signed interaction data. The signature can be validated using a previously stored public key corresponding to the private key utilized to sign the interaction data. For example the stored public key can be a public key received, by the participating server computer, from the user device 402 during enrollment. For example, a participating server computer can receive the public key of the user device 402 at step 26 of FIG. 3.

If the server computer determines that the signature of the signed interaction data is valid, then the server computer can proceed to step 21. If the server computer determines that the signature of the signed interaction data is not valid, then the server computer can terminate the interaction and/or provide an invalid signature notification to the resource provider computer 404.

At step 21, after validating the signature of the signed interaction data, the each participating server computer can provide a profile to the resource provider computer 404. In some embodiments, the profile can comprise one or more profiles associated with the user of the user device 402. A profile can include portable device credentials (e.g., payment card data) associated with the user. For example, the server computer can transmit a getSRTProfile response (e.g., a portable device credential list) to the resource provider computer 404. Each participating server computer can provide different portable device credentials to the resource provider computer 404.

In some embodiments, a server computer can mask the portable device credentials to form masked portable device credentials. Masking the portable device credentials can further increase security of the portable device credentials such that the portable device credentials themselves are not make available to the resource provider computer 404 or to potential malicious parties that intercept the messages. The server computer can mask the portable device credentials in any suitable manner. For example, the server computer can remove a first predetermined number of digits of the portable device credential. Each server computer of the plurality of server computers 306 can provide the masked portable device credentials to the resource provider computer 304 rather than the portable device credentials. The resource provider computer 404 can obtain each of the masked portable device credentials from a different server computer based on the signed interaction data generated by the authenticator.

As an illustrative example, the resource provider computer 404 can provide the signed interaction data to a first server computer and a second server computer (e.g., participating server computers), but not provide the signed interaction data to a third server computer (e.g., a non-participating server computer). The first server computer and the second server computer can both independently validate the signature of the signed interaction data. After validating the signature, the first server computer and the second server computer can retrieve portable device credentials associated with the public key, and therefore the user device 402. The portable device credentials can be stored at any suitable database or memory for each different server computer.

For example, the first server computer can obtain first portable device credentials that can allow the user to access their employer's building. The second server computer can obtain second portable device credentials that can allow the user to access their house. The first portable device credentials can be for a first portable device, whereas the second portable device credentials can be for a second portable device. The first portable device can be different than the second portable device. The first portable device and the second portable device can both be associated with the user of the user device 402.

As an additional example, the first server computer can obtain first portable device credentials that can include credit card information (e.g., PAN, CVV, expiration date, etc.), which is issued from a first authorizing entity of a first authorizing entity computer. The second server computer can obtain second portable device credentials that can include debit card information, which is issued from a second authorizing entity of a second authorizing entity computer.

The first server computer can provide the first portable device credentials to the resource provider computer 404. The second server computer can provide the second portable device credentials to the resource provider computer 404.

In some embodiments, the first server computer can mask the first portable device credentials to form masked first portable device credentials, then provide the masked first portable device credentials to the resource provider. The first server computer can mask the first portable device credentials in any suitable manner. For example, the first server computer can mask the first portable device credentials by removing the first predetermined number of digits, the last predetermined number of digits, and/or the center predetermined number of digits from the first portable device credentials. For example, the first portable device credentials can include an account number of "123456789123456." The first server computer can mask the first portable device credentials to form masked first portable device credentials of "3456," "*3456," "1234," "56789," etc. The second server computer can similarly mask the second portable device credentials to form masked second portable device credentials, then provide the masked second portable device credentials to the resource provider computer 404**.

At step 22, after receiving the portable device credentials from the one or more server computers (e.g., the participating server computers), the resource provider computer 404 can generate a portable device credential list. The portable device credential list can be an ordered list comprising the received portable device credentials from each server computer. In some embodiments, the resource provider computer can order the cards of the card list in any suitable manner. In some embodiments, the resource provider computer 404 can generate the list using received masked portable device credentials.

At step 23, the resource provider computer 404 can provide the portable device credential list to the user device 402.

At step 24, after receiving the portable device credential list, the user device 402 can display the portable device credential list on any suitable display (e.g., a screen) to present the portable device credentials to the user for selection. The user can select any portable device credential of the portable device credential list. The user device 402 can receive the selection of the portable device credential via user input.

For example, the user device 402 can present the user with the portable device credential list that includes the first portable device credential that allows the user to access their employer's building and the second portable device credential that allows the user to access their house. The user can select which portable device credential to utilize. For example, the user can select to utilize the second portable device credential to access their house. However, it is understood that in some embodiments, a particular portable device credential may not be limited to a particular use case, such as a location. Rather, in some embodiments, the user can select any presented portable device credential to perform the interaction. For example, the user can be presented with two different portable device credentials that are associated with two different credit cards. The user can select between which credit card to utilize for the current interaction (e.g., a transaction), where the success of the interaction is not dependent upon which portable device credential is selected.

At step 25, after receiving a selection of the selected portable device credential from the user, the user device 402 can transmit the selected portable device credential to the resource provider computer 404. In some embodiments, if the portable device credentials were previously masked by the server computers, then the user can select a masked portable device credential, which the user device 402 can then send to the resource provider computer 404.

At step 26, after receiving the selected portable device credential, the resource provider computer 404 can generate an authorization request message comprising at least the selected portable device credentials.

At step 27, after generating the authorization request message, the resource provider computer 404 can transmit the authorization request message to the server computer associated with the selected portable device credentials.

At step 28, after receiving the authorization request message, the server computer can determine whether or not to authorize the interaction. The server computer can determine whether or not to authorize the interaction based on any suitable data known to the server computer (e.g., the interaction data, the server computer data, etc.). The server computer can generate an indication of whether or not the interaction is authorized. For example, if the server computer determines to authorize the interaction, then the server computer can generate an indication that the interaction is authorized. If the server computer determines not to authorize the interaction, then the server computer can generate an indication that the interaction is not authorized. In some embodiments, the server computer can transmit an authorization request message to an authorizing entity computer to obtain authorization for the transaction.

Further, during step 28, after determining whether or not to authorize the interaction, the server computer can generate an authorization response message in response to the authorization request message. The authorization response message can comprise the indication of whether or not the interaction is authorized. In other embodiments, the server computer can receive an authorization response message from an authorizing entity computer.

At step 29, after generating or receiving the authorization response message, the server computer can transmit the authorization response message to the resource provider computer 404. Once the resource provider computer 404 receives the authorization response message (not shown), the resource provider computer 404 can evaluate the authorization response message. The resource provider computer 404 can determine if the authorization response message indicates that the interaction is authorized. If the interaction is authorized, the resource provider computer 404 can provide an interaction response message to the user device 402 indicating that the interaction is authorized. The resource provider computer 404 can further provide the requested resource to the user of the user device 402. For example, the resource provider computer 404, or a computer prompted by the resource provider computer 404, can release a physical product to the user, provide a digital file the user device 402, allow the user device 402 to access a secure webpage, allow the user to enter a secure location, place an order for delivery to the user's location, and/or any other suitable action that completes the interaction.

In other embodiments, after step 24, when the user selects a masked portable device credential of the masked portable device credential list, the user device 402 can determine a token reference identifier associated with the selected masked portable device credential. The token reference identifier can be previously stored on the user device 402. Each masked portable device credential can correspond to a different token reference identifier. For example, the user can be associated with two masked portable device credentials. A first masked portable device credential can correspond to a first token reference identifier. A second masked portable device credential can correspond to a second token reference identifier. In some embodiments, a token reference identifier can include a unique alphanumeric identifier. Each portable device credential can correspond to a token reference identifier.

Once the user device 402 determines the token reference identifier that corresponds to the selected masked portable device credential. The user device 402 can provide the token reference identifier to the resource provider computer 404

(e.g., at step 25). In some embodiments, the user device 402 can provide the token reference identifier and the selected masked portable device credential to the resource provider computer 404. In yet other embodiments, the token reference identifier associated with the selected masked portable device credential may be provided to the server computer in the plurality of server computers 406. The server computer may then use the token reference identifier to obtain a stored token. This token may then be used to conduct a transaction. It may be provided to the resource provider computer 404 directly or visa the user device 402, and the resource provider computer 404 may generate and transmit an authorization request message including the token. In other embodiments, the server computer may generate the authorization request message including the token after receiving any interaction data (e.g., transaction data) from the resource provider computer 404.

The resource provider and/or server computer then transmits the authorization request message comprising the token and the interaction data to a transport computer (not shown). The transport computer may be operated by an acquirer, which is typically a system for an entity (e.g., a bank) that has a business relationship with a particular merchant, a wallet provider or another entity.

After receiving the authorization request message, the transport computer forwards the authorization request message to a processing network computer (not shown). The processing network computer can be configured to provide authorization services, and clearing and settlement services for payment transactions. The processing network computer may include data processing subsystems, networks, and operations used to support and deliver authorization services, exception file services, and clearing and settlement services. The processing network computer may forward the authorization request received from the transport computer to the authorizing entity computer via a communication channel.

In some embodiments, the processing network computer can modify the authorization request message to replace the token with the portable device credential. The processing network computer may modify the authorization request message in conjunction with a token provider computer (not shown). For example, the processing network computer, after receiving the authorization request message, can provide the token of the authorization request message to the token provider computer in a portable device credential request message.

The token provider computer can be a system that services tokens. In some embodiments, the token provider computer can facilitate requesting, determining (e.g., generating) and/or issuing tokens, as well as maintaining an established mapping of tokens to primary account numbers (PANs) and/or other portable device credentials in a repository (e.g. token vault). In some embodiments, the token provider computer may establish a token assurance level for a given token to indicate the confidence level of the token to PAN binding. The token provider computer may include or be in communication with a token vault where the generated tokens are stored. The token provider computer may support token processing of payment transactions submitted using tokens by de-tokenizing the tokens to obtain the portable device credentials. After determining the portable device credential associated with the token, the token provider computer can provide a portable device credential response message comprising the portable device credential to the processing network computer.

After receiving the portable device credential response message, the processing network computer can modify the authorization request message to replace the token with the portable device credential. In some embodiments, the processing network computer can add the portable device credential to the authorization request message, such that the authorization request message comprises the token, the interaction data, and the portable device credential. The processing network computer then transmits the authorization request message to the authorizing entity computer (not shown).

The authorizing entity computer can be operated by an account issuer that issues and maintains an account of the user of the user device 402. For example, the authorizing entity computer can be a first authorizing entity computer operated by a first authorizing entity that issued the selected portable device credentials and maintains an account associated with the selected portable device credentials. The authorizing entity computer can determine whether or not to authorize the interaction based on the interaction data, the token, the portable device credential, and/or data associated with the user and/or the user device 402 stored by the authorizing entity computer. The authorizing entity computer can generate an indication of whether or not the interaction is authorized. The authorizing entity computer can generate an authorization response message comprising the indication of whether or not the interaction is authorized. In some embodiments, the authorization response message can further comprise the portable device credential and/or the interaction data. In some embodiments, the authorization response message can further comprise the token. After generating the authorization response message, the authorizing entity computer can transmit the authorization response message to the processing network computer.

After receiving the authorization response message, the processing network computer can, in some embodiments, modify the authorization response message to replace the portable device credential with the token. The processing network computer can then provide the authorization response message to the transport computer.

After receiving the authorization response message from the processing network computer, the transport computer can provide the authorization response message to the resource provider computer 404 if the authorization request message was received from the resource provider computer 404 or can provide the authorization response message to the server computer if the authorization request message was received from the server computer of the plurality of server computers 406.

In some embodiments, the user device 402 can perform a second interaction. For example, the aforementioned interaction request message can be a first interaction request message, the recognition request message can be a first recognition request message, the one or more recognition response messages can be one or more first recognition response messages, the server computer data can be first server computer data, the recognition response message can be a first recognition response message, the user credential verification request message can be a first user credential verification request message, the server computer data can be first server computer data, the interaction data can be first interaction data, the interaction can be a first interaction, the user credential verification response message can be a first user credential verification response message, the signed interaction data can be first signed interaction data, and the plurality of portable device credentials can be a plurality of first portable device credentials.

The user device 402 can initiate the second interaction with the resource provider computer 404 or another resource provider computer. The user device 402 can provide a second interaction request message comprising the recognition identifier. After the resource provider computer 404 or the other resource provider computer receives the recognition identifier, the resource provider computer 404 or the other resource provider computer can provide a second recognition request message comprising the second recognition identifier to the plurality of server computers.

Each server computer can determine whether or not the recognition identifier is recognized, as described herein, then generate a second recognition response message. Each server computer can provide the second recognition response message to the resource provider computer 404 or the other resource provider computer.

The resource provider computer 404 or the other resource provider computer can respectively receive one or more second recognition response messages from one or more server computers of the plurality of server computers. Each second recognition response message comprising the user identifier and second server computer data (as compared to the first server computer data of the first interaction). However, it is understood that each server computer provides different server computer data. The utilization of first and second in this example is to distinguish between the first interaction and the second interaction.

The resource provider computer 404 or the other resource provider computer can then select a second selected recognition response message of the one or more recognition response messages. The second recognition response message is received from a different server computer than the first recognition response message.

After selecting the second selected recognition response message, the resource provider computer 404 or the other resource provider computer can generate a second user credential verification request message comprising the user identifier, the second server computer data of the second selected recognition response message, and second interaction data. The resource provider computer 404 or the other resource provider computer then transmits the second user credential verification request message to the universal authentication application The universal authentication application then receives the second user credential verification request message comprising the user identifier, the second server computer data, and the second interaction data for the second interaction between the resource provider of the resource provider computer or another resource provider of the other resource provider computer and the user of the user device 402. The first server computer data can originate from a first server computer and the second server computer data originates from a second server computer;

The universal authentication application can then transmit the second user credential verification request message to the Web browser that invokes the authenticator to verify the biometric information of the user. After the authenticator authenticates the user, as described herein, the universal authentication application receives a second user credential verification response message from the authenticator. The second user credential verification response message comprising second signed interaction data.

The universal authentication application then sends the second user credential verification response message to the resource provider computer 404 of the other resource provider computer. The resource provider computer 404 or the other resource provider computer then receives the second user credential verification response message from the authenticator via the universal authentication application. The resource provider computer 404 or the other resource provider computer can then provide the second signed interaction data to the plurality of server computers 406 to obtain portable device credentials, or masked portable device credentials, that are associated with the user if the server computers verify the signature of the second signed interaction data. The resource provider computer 404 or the other resource provider computer and the other devices of the system can then perform the process similar to steps 22-29 for the second interaction.

Figure 5A:
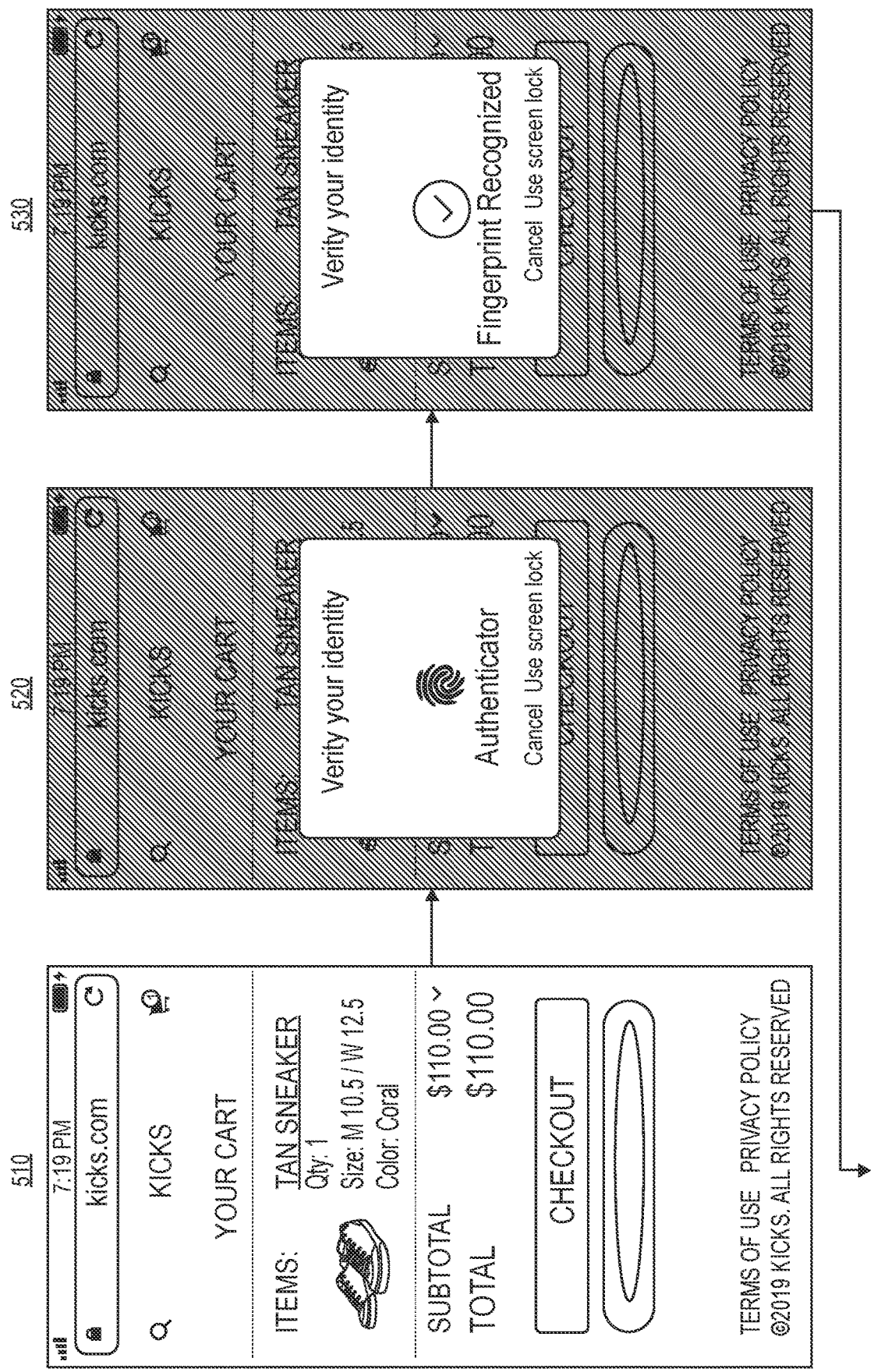

FIGS. 5A and 5B show user interfaces illustrating a flow of an exemplary user experience using biometrics with WebAuthn according to various embodiments. Various images (e.g., frames) of the user device's display are included in FIGS. 5A and 5B. Each frame can correspond to a step(s) in FIGS. 3-4. For example, at frame 510, the user can select a resource (e.g., a pair of shoes) and proceed to checkout on a webpage maintained by a resource provider computer.

At frame 520, after the user selects to checkout, the user device can prompt the user to verify their identity (e.g., by providing biometric information). The user can then input their biometric information to an authenticator of the user device. For example, the user can scan their fingerprint, faceprint, etc. on the user device. The authenticator of the user device can then authenticate the user based on the input biometric information. If the user's input biometric information matches stored biometric information, then the user device can display from 530.

At frame 530, the user device can display an indication that the user's fingerprint is recognized (e.g., that the user is authenticated).

At frame 540, after the user device receives a list of portable device credentials (as described above), the user device can prompt the user to select a portable device credential presented in a portable device list. For example, the user can be associated with a plurality of portable devices credential, which are displayed to the user for selection for utilization for the interaction. The user can select at least one portable device credential (e.g., a card account).

At frame 550, after a portable device credential has been selected, the user device can prompt the user to confirm the interaction. After the user confirms the interaction with a selected portable device credential, the user device can provide the selected portable device credential to the resource provider computer.

At frame 560, after the resource provider communicates with the server computer regarding authorization of the interaction, the user device can display a confirmation message to the user. The confirmation message can display an indication of whether or not the interaction is authorized, thus concluding the interaction between the user of the user device and the resource provider of the resource provider computer.

Embodiments of the disclosure have a number of advantages. Conventional secure remote platform systems such as SRT systems use browser cookies to authenticate a user's device and retrieve registered account information of different cards. A problem with this is that browser cookies stored on the user's device can be stolen or can be inadvertently deleted. Embodiments provide for the advantage that browser cookies do not need to be stored on the user device. Thus increasing security of user data as well as decreasing the data storage requirements of the user device.

Embodiments of the disclosure further provide for advantages over simply utilizing Web Authentication (WebAuthn), which provides a way to authenticate users for web applications using other types of information such as biometric authentication. A drawback of utilizing WebAuthn with biometric authentication is that a separate biometric verification may be required for each account credential associated with a user. Thus, when retrieving account information with different SRT systems to display a card list for interaction selection during an interaction, a separate biometric reading may be requested for each SRT system.

This is burdensome for both the user and the devices involved in the process. For example, the user needs to input their biometric information multiple different times in order to allow multiple SRT systems to provide portable device credentials to be displayed in the card list. Embodiments provide for the advantage of requesting biometric information a single time even when multiple SRT systems are pending authentication of the user before providing portable device credentials. Furthermore, embodiments provide for the advantage of reducing the number of communications made in the system. For example, if there are three SRT systems involved, then conventionally, each SRT system needs to communicate with the user device to request biometric authentication. However, according to various embodiments, a single user credential verification request can be provided to the universal authentication application on the user device, cutting the number of communications to the user device by 66% (in this example).

Embodiments provide for additional advantages. In conventional methods (e.g., simply utilizing WebAuthn), a bottleneck in processing capabilities occurs when the user device is only able to request a single biometric reading at a time. This lengthens the total time it takes to process the interaction. Embodiments provide for the advantage of processing the interaction is less time, due to the fact that only a single biometric authentication process needs to occur.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by a universal authentication application from a resource provider computer, a user credential verification request message comprising a user identifier, server computer data, and interaction data for an interaction between a resource provider of the resource provider computer and a user of a user device;
transmitting, by the universal authentication application, the user credential verification request message to a web browser that invokes an authenticator to verify biometric information of the user;
receiving, by the universal authentication application, a user credential verification response message from the authenticator, the user credential verification response message comprising signed interaction data; and
sending, by the universal authentication application, the user credential verification response message to the resource provider computer, wherein the resource provider computer provides at least the signed interaction data to a plurality of server computers to retrieve a plurality of portable device credentials respectively associated with the plurality of server computers,
wherein the server computer data is first server computer data, and wherein prior to receiving the user credential verification request message, the resource provider computer a) receives an interaction request message comprising a recognition identifier from the user device, b) provides a recognition request message comprising the recognition identifier to the plurality of server computers, c) respectively receives one or more recognition response messages from one or more server computers of the plurality of server computers, each recognition response message comprising the user identifier and server computer data that relates to each respective server computer, d) selects a selected recognition response message of the one or more recognition response messages, and e) generates the user credential verification request message comprising the user identifier, the first server computer data of the selected recognition response message, and the interaction data.

2. The method of claim 1, wherein the universal authentication application is a component on the user device.

3. The method of claim 2, wherein the user device further includes the authenticator.

4. The method of claim 1, wherein the universal authentication application provides one user credential verification request message to the web browser for the interaction, wherein the universal authentication application receives the user credential verification request message from the resource provider computer regardless of which server computer of the plurality of server computers is associated with the selected recognition response message.

5. The method of claim 1, wherein the server computer data originates from any server computer of the plurality of server computers.

6. The method of claim 1, wherein the authenticator determines whether or not to verify the biometric information of the user based at least on the server computer data.

7. The method of claim 6, wherein the plurality of portable device credentials are a plurality of masked portable device credentials, wherein the resource provider computer obtains each of the masked portable device credentials from a different server computer based on the signed interaction data generated by the authenticator.

8. A method comprising:
receiving, by a universal authentication application from a resource provider computer, a user credential verification request message comprising a user identifier, server computer data, and interaction data for an interaction between a resource provider of the resource provider computer and a user of a user device;
transmitting, by the universal authentication application, the user credential verification request message to a web browser that invokes an authenticator to verify biometric information of the user;
receiving, by the universal authentication application, a user credential verification response message from the authenticator, the user credential verification response message comprising signed interaction data; and
sending, by the universal authentication application, the user credential verification response message to the resource provider computer, wherein the resource provider computer provides at least the signed interaction data to a plurality of server computers to retrieve a plurality of portable device credentials respectively associated with the plurality of server computers,
wherein the user credential verification request message is a first user credential verification request message, the server computer data is first server computer data, the interaction data is first interaction data, the interaction is a first interaction, the user credential verification response message is a first user credential verification response message, the signed interaction data is first signed interaction data, the plurality of portable device credentials are a plurality of first portable device credentials,
wherein the method further comprises:
receiving, by the universal authentication application from the resource provider computer or another resource provider computer, a second user credential verification request message comprising the user identifier, second server computer data, and second interaction data for a second interaction between the resource provider of the resource provider computer and the user of the user device, wherein the first server computer data originates from a first server computer and the second server computer data originates from a second server computer;
transmitting, by the universal authentication application, the second user credential verification request message to the Web browser that invokes the authenticator to verify the biometric information of the user;
receiving, by the universal authentication application, a second user credential verification response message from the authenticator, the second user credential verification response message comprising second signed interaction data; and
sending, by the universal authentication application, the second user credential verification response message to the resource provider computer, wherein the resource provider computer provides at least the second signed interaction data to at least one of the plurality of server computers to retrieve the plurality of portable device credentials respectively associated with the plurality of server computers.

9. A user device comprising:
a processor; and
a computer-readable medium coupled to the processor, the computer-readable medium comprising code executable by the processor for implementing a method comprising:
receiving, by a universal authentication application of the user device from a resource provider computer, a user credential verification request message comprising a user identifier, server computer data, and interaction data for an interaction between a resource provider of the resource provider computer and a user of the user device;
transmitting, by the universal authentication application, the user credential verification request message to a web browser that invokes an authenticator to verify biometric information of the user;
receiving, by the universal authentication application, a user credential verification response message from the authenticator, the user credential verification response message comprising signed interaction data; and
sending, by the universal authentication application, the user credential verification response message to the resource provider computer, wherein the resource provider computer provides at least the signed interaction data to a plurality of server computers to retrieve a plurality of portable device credentials respectively associated with the plurality of server computers,
wherein the user credential verification request message is a first user credential verification request message, the server computer data is first server computer data, the interaction data is first interaction data, the interaction is a first interaction, the user credential verification response message is a first user credential verification response message, the signed interaction data is first signed interaction data, the plurality of portable device credentials are a plurality of first portable device credentials,
wherein the method further comprises:
receiving, by the universal authentication application from the resource provider computer or another resource provider computer, a second user credential verification request message comprising the user identifier, second server computer data, and second interaction data for a second interaction between the resource provider of the resource provider computer and the user of the user device, wherein the first server computer data originates from a first server computer and the second server computer data originates from a second server computer;

transmitting, by the universal authentication application, the second user credential verification request message to the Web browser that invokes the authenticator to verify the biometric information of the user;

receiving, by the universal authentication application, a second user credential verification response message from the authenticator, the second user credential verification response message comprising second signed interaction data; and sending, by the universal authentication application, the second user credential verification response message to the resource provider computer, wherein the resource provider computer provides at least the second signed interaction data to at least one of the plurality of server computers to retrieve the plurality of portable device credentials respectively associated with the plurality of server computers.

10. The user device of claim 9, wherein after the authenticator verifies the biometric information of the user, the authenticator signs the interaction data with a private key.

11. The user device of claim 9, wherein the user identifier is a universally unique identifier.

12. The user device of claim 9, wherein the interaction is a secure data interaction, a secure webpage interaction, or a secure location interaction.

13. A method comprising:
receiving, by a resource provider computer, an interaction request message comprising a recognition identifier from a user device;
providing, by the resource provider computer, a recognition request message comprising the recognition identifier to a plurality of server computers;
respectively receiving, by the resource provider computer, two or more recognition response messages from two or more server computers of the plurality of server computers, each recognition response message comprising a user identifier and server computer data;
selecting, by the resource provider computer, a selected recognition response message of the one or more recognition response messages;
generating, by the resource provider computer, a user credential verification request message comprising the user identifier, the server computer data of the selected recognition response message, and interaction data;
transmitting, by the resource provider computer, the user credential verification request message to a universal authentication application, wherein the universal authentication application provides the user credential verification request message to a web browser that invokes an authenticator to verify biometric information of a user of the user device; and
receiving, by the resource provider computer, a user credential verification response message from the authenticator via the universal authentication application, the user credential verification response message comprising signed interaction data.

14. The method of claim 13 further comprising:
providing, by the resource provider computer, the signed interaction data to the plurality of server computers, wherein each server computer of the plurality of server computers validates a signature of the signed interaction data; and
receiving, by the resource provider computer, portable device credentials from the one or more server computers.

15. The method of claim 14 further comprising:
generating, by the resource provider computer, an ordered list of the portable device credentials;
providing, by the resource provider computer, the ordered list of the portable device credentials to the user device, wherein the user device displays the ordered list of the portable device credentials to the user of the user device, receives a selection of portable device credentials from the ordered list, and provides the selection of portable device credentials to the resource provider computer; and
receiving, by the resource provider computer, the selection of portable device credentials from the user device.

16. The method of claim 15 further comprising:
generating, by the resource provider computer, an authorization request message comprising at least the selection of portable device credentials;
providing, by the resource provider computer, the authorization request message to the server computer, wherein the server computer, determines whether or not to authorize an interaction associated with the signed interaction data and the portable device credentials, and generates an authorization response message comprising at least an indication of whether or not the interaction is authorized; and
receiving, by the resource provider computer, the authorization response message from the server computer.

17. The method of claim 13, wherein the interaction request message is a first interaction request message, the recognition request message is a first recognition request message, the one or more recognition response messages are one or more first recognition response messages, the server computer data is first server computer data, the recognition response message is a first recognition response message, the user credential verification request message is a first user credential verification request message, the interaction data is first interaction data, the user credential verification response message is a first user credential verification response message, and the signed interaction data is first signed interaction data,
wherein the method further comprises:
receiving, by the resource provider computer, a second interaction request message comprising the recognition identifier from the user device;
providing, by the resource provider computer, a second recognition request message comprising the recognition identifier to the plurality of server computers;
respectively receiving, by the resource provider computer, one or more second recognition response messages from one or more server computers of the plurality of server computers, each second recognition response message comprising the user identifier and second server computer data;
selecting, by the resource provider computer, a second selected recognition response message of the one or more recognition response messages, wherein the second recognition response message is received from a different server computer than the first recognition response message;
generating, by the resource provider computer, a second user credential verification request message comprising the user identifier, the second server computer data of the second selected recognition response message, and second interaction data;
transmitting, by the resource provider computer, the second user credential verification request message to the universal authentication application, wherein the universal authentication application provides the second user credential verification request message to the web browser that invokes the authenticator to verify the biometric information of the user of the user device; and receiving, by the resource provider computer, a second user credential verification response message from the authenticator via the universal authentication application, the second user credential verification response message comprising second signed interaction data.

18. The method of claim 13, wherein selecting the recognition response message of the one or more recognition response messages further comprises:

selecting, by the resource provider computer, a first received recognition response message of the one or more recognition response messages, wherein the first received recognition response message is the selected recognition response message.

19. A resource provider computer comprising:

a processor; and a computer-readable medium coupled to the processor, the computer-readable medium comprising code executable by the processor for implementing a method comprising:

receiving, by the resource provider computer, an interaction request message comprising a recognition identifier from a user device;

providing, by the resource provider computer, a recognition request message comprising the recognition identifier to a plurality of server computers;

respectively receiving, by the resource provider computer, two or more recognition response messages from two or more server computers of the plurality of server computers, each recognition response message comprising a user identifier and server computer data;

selecting, by the resource provider computer, a selected recognition response message of the one or more recognition response messages;

generating, by the resource provider computer, a user credential verification request message comprising the user identifier, the server computer data of the selected recognition response message, and interaction data;

transmitting, by the resource provider computer, the user credential verification request message to a universal authentication application, wherein the universal authentication application provides the user credential verification request message to a web browser that invokes an authenticator to verify biometric information of a user of the user device; and receiving, by the resource provider computer, a user credential verification response message from the authenticator via the universal authentication application, the user credential verification response message comprising signed interaction data.

* * * * *